US009557416B2

(12) United States Patent
Samuthirapandian et al.

(10) Patent No.: US 9,557,416 B2
(45) Date of Patent: Jan. 31, 2017

(54) SYSTEM AND METHOD FOR GRAPHICALLY DISPLAYING NEIGHBORING ROTORCRAFT

(71) Applicant: HONEYWELL INTERNATIONAL INC., Morristown, NJ (US)

(72) Inventors: Subash Samuthirapandian, Tamilnadu (IN); Mohammed Ibrahim Mohideen, Karnataka (IN); Elsa Mary Sebastian, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 147 days.

(21) Appl. No.: 14/513,777

(22) Filed: Oct. 14, 2014

(65) Prior Publication Data

US 2016/0103217 A1 Apr. 14, 2016

(51) Int. Cl.

| | |
|---|---|
| ***G01S 13/93*** | (2006.01) |
| ***G01S 13/91*** | (2006.01) |
| ***G01C 23/00*** | (2006.01) |
| ***G08G 5/02*** | (2006.01) |
| ***G01S 7/22*** | (2006.01) |

(52) U.S. Cl.

CPC ............... *G01S 13/93* (2013.01); *G01C 23/00* (2013.01); *G01S 7/22* (2013.01); *G01S 13/91* (2013.01); *G08G 5/025* (2013.01); *G01S 2013/916* (2013.01); *G01S 2013/9335* (2013.01)

(58) Field of Classification Search

USPC .......................................................... 701/301

See application file for complete search history.

(56) References Cited

U.S. PATENT DOCUMENTS

| | | | | |
|---|---|---|---|---|
| 3,416,033 | A * | 12/1968 | Hoover | B64D 1/22 174/140 S |
| 3,471,108 | A * | 10/1969 | Corso | G01C 21/16 244/17.13 |
| 6,433,729 | B1 | 8/2002 | Staggs | |
| 6,480,763 | B1 * | 11/2002 | Lappos | G08G 5/0021 340/954 |
| 8,362,925 | B2 | 1/2013 | Brinkman et al. | |
| 8,600,651 | B2 | 12/2013 | Clark et al. | |
| 8,604,942 | B2 | 12/2013 | Whitlow et al. | |
| 2004/0193386 | A1 * | 9/2004 | Flynn | G01G 19/07 702/173 |
| 2006/0167618 | A1 * | 7/2006 | Werback | G08G 5/0008 701/120 |

(Continued)

FOREIGN PATENT DOCUMENTS

| | | | | |
|---|---|---|---|---|
| EP | 2228626 | A2 * | 9/2010 | G01C 23/00 |
| EP | 2899509 | A1 | 7/2015 | |
| TW | 2899589 | A1 * | 7/2015 | G02F 1/134309 |

OTHER PUBLICATIONS

Extended EP search report for Application No. 15188797.3-1557 dated Mar. 18, 2016.

*Primary Examiner* — Shelley Chen

(74) *Attorney, Agent, or Firm* — Lorenz & Kopf, LLP

(57) ABSTRACT

A system and method is provided that displays graphical symbology that enables a pilot to rapidly discern (1) that a neighboring aircraft is a rotorcraft, and (2) whether the rotorcraft is hovering. The provided system and method enables a user to define hovering, by editing a position change (distance) within a predetermined time.

15 Claims, 5 Drawing Sheets

500

09L
27R
14L
22R
HOVER
510
512
MAIN TOWER
14R
506
09R
04L
27L
32R
KORD
502
1 NM
MAIN TOWER
32L
10
28
22L
508
504

(56) References Cited

U.S. PATENT DOCUMENTS

| | | | | |
|---|---|---|---|---|
| 2009/0138142 | A1* | 5/2009 | Still | G01C 23/00 701/4 |
| 2010/0231418 | A1* | 9/2010 | Whitlow | G01C 23/00 340/945 |
| 2014/0124621 | A1* | 5/2014 | Godzdanker | B64F 1/125 244/110 E |
| 2015/0344134 | A1* | 12/2015 | Cruz Ayoroa | B64C 29/0033 244/48 |

* cited by examiner

SYSTEM AND METHOD FOR GRAPHICALLY DISPLAYING NEIGHBORING ROTORCRAFT

TECHNICAL FIELD

Embodiments of the subject matter described herein relate generally to vehicular display systems and, more particularly, to an avionic display system for graphically displaying, on a host aircraft, symbology that visually distinguishes neighboring hovering rotorcraft and non-hovering rotorcraft.

BACKGROUND

In addition to maintaining an active out-the-window scanning activity, pilots rely on various tools and displays to provide necessary information for maintaining situational awareness. Information about neighboring aircraft traffic may be visually presented on one or more onboard displays including, but not limited to, a primary flight display, a multifunction display, and/or navigation display in a top-down, moving map format. Applications such as CDTI (Cockpit Display of Traffic Information) and ACAS (Airborne Collision Avoidance System) provide the onboard display with the visual information. A source of aircraft surveillance technology such as Automatic Dependent Surveillance-Broadcast (ADS-B) typically provides the traffic information to be displayed via a moving map display, CDTI or ACAS.

In the course of maintaining an active out-the-window scanning activity, pilots may have extended periods of time during which they are only periodically paying attention to the moving map display. Therefore, the graphic display of information on the moving map display should be such as to clearly present the information in a manner that promotes at-a-glance situational awareness.

Rotorcraft are a unique category of aircraft traffic in that a rotorcraft's status may be "hovering" or "not hovering." Human eyes have limitations in spotting motionless objects, and discerning whether a traffic object is a rotorcraft and whether it is or is not hovering is difficult and the time consumed thereby is excessive. Therefore, it is important to the operation and safety of both fixed wing and rotary wing aircraft to be aware of hovering rotorcraft.

Accordingly, a system and method that displays graphical symbology that enables a pilot to rapidly discern that (1) a neighboring aircraft is a rotorcraft, and (2) whether the rotorcraft is hovering, is desirable. It would also be desirable to provide a system and method that enables a user to define hovering, by editing a position change (distance) within a predetermined time.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A method is provided for displaying a rotorcraft icon. Aircraft traffic data is received, and a first rotorcraft is identified at a first location. The method determines whether the first rotorcraft is hovering and displays a hovering rotorcraft icon on the display when the rotorcraft is determined to be hovering.

Another method is provided for displaying a rotorcraft icon on a monitor included within an avionic display system of a host aircraft. The method receives aircraft traffic data and identifies a first rotorcraft at a first location. A rotorcraft icon representative of the first rotorcraft is displayed and the method determines whether the first rotorcraft is hovering. When the first rotorcraft is determined to be hovering, the rotorcraft icon is overlaid with a substantially circular ring.

Also provided is an avionic display system for deployment onboard an aircraft including an air traffic data source that provides the avionic display system with aircraft traffic data. A monitor is included within the avionic display system, on which the avionic display system receives and graphically displays surrounding aircraft traffic data. The avionic display system also includes a processor operatively coupled to the monitor and configured (1) receive position data associated with a first rotorcraft, (2) determine whether the first rotorcraft is hovering, and (3) graphically display a hovering rotorcraft icon on the display when the first rotorcraft is determined to be hovering.

BRIEF DESCRIPTION OF THE DRAWINGS

A more complete understanding of the subject matter may be derived from the following detailed description taken in conjunction with the accompanying drawings, wherein, like reference numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
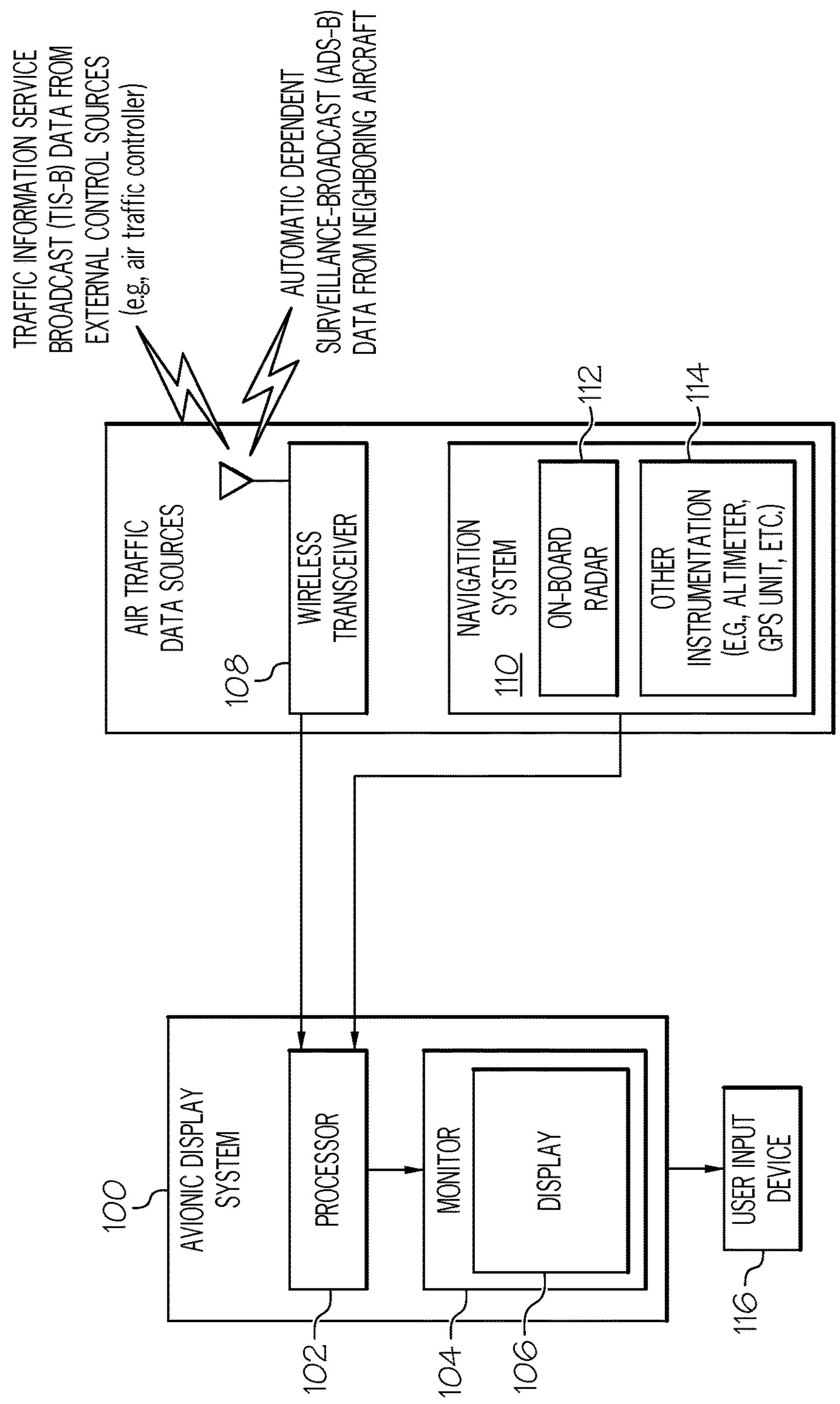
FIG. 1 is a block diagram of a generalized avionic display system in accordance with an exemplary embodiment.

FIG. 1 is functional block diagram that includes a generalized avionic display system 100 in accordance with an exemplary embodiment. Avionic display system 100 includes at least one processor 102 and at least one monitor 104, which is operatively coupled to processor 102. During operation of avionic display system 100, processor 102 drives monitor 104 to produce a graphical display 106 that visually provides a pilot and crew with navigational informational pertaining to the host aircraft and to neighboring aircraft within a predetermined vicinity of the host aircraft.

Graphical display 106 may include visual representations of one or more flight characteristics pertaining to a neighboring aircraft, as described more fully below. Processor 102 may generate graphical display 106 in a two dimensional format (e.g., as a moving map display), in a three dimensional format (e.g., as a perspective display), or in a hybrid format (e.g., in a picture-in-picture or split screen arrangement).

Processor 102 may comprise, or be associated with, any suitable number of individual microprocessors, flight control computers, navigational equipment, memories, power supplies, storage devices, interface cards, and other standard components known in the art. In this respect, the processor 102 may include or cooperate with any number of software programs (e.g., avionic display programs) or instructions designed to carry out the various methods, process tasks, calculations, and control/display functions described below. Processor 102 is included within a Flight Management Computer of the type commonly deployed within a Flight Management System (FMS).

Image-generating devices suitable for use as monitor 104 include various analog (e.g., cathode ray tube) and digital (e.g., liquid crystal, active matrix, plasma, etc.) display devices. In certain embodiments, monitor 104 may assume the form of a Head-Down Display (HDD) or a Head-Up Display (HUD) included within an aircraft's Electronic Flight Instrument System (EFIS). Monitor 104 may be disposed at various locations throughout the cockpit. For example, monitor 104 may comprise a primary flight display (PFD) and reside at a central location within the pilot's primary field-of-view. Alternately, monitor 104 may comprise a secondary flight deck display, such as an Engine Instrument and Crew Advisory System (EICAS) display, mounted at a location for convenient observation by the aircraft crew but that generally resides outside of the pilot's primary field-of-view. In still further embodiments, monitor 104 may be worn by one or more members of the flight crew.

Processor 102 includes one or more inputs operatively coupled to one or more air traffic data sources. During operation of display system 100, the air traffic data sources continually provide processor 102 with navigational data pertaining to neighboring aircraft. In the exemplary embodiment illustrated in FIG. 1, the air traffic data sources include a wireless transceiver 108 and a navigation system 110, which are operatively coupled to first and second inputs of processor 102, respectively. Navigation system 110 includes onboard radar 112 and various other onboard instruments 114, such as a radio altimeter, a barometric altimeter, a global positioning system (GPS) unit, and the like. Navigation system 110 may be included within a FMS, and onboard radar 112 may be included within a Terrain Awareness and Warning System (TAWS), such as an Enhanced Ground Proximity Warning System (EGPWS).

With continued reference to FIG. 1, wireless transceiver 108 is considered an air traffic data source in that transceiver 108 receives navigational data from external control sources and relays this data to processor 102. For example, wireless transceiver 108 may receive Traffic Information Services-Broadcast (TIS-B) data from external control sources, such as satellite and various ground-based facilities including Air Traffic Control Centers, Terminal Radar Approach Control Facilities, Flight Service Stations, control towers, and the like. In addition, wireless transceiver 108 may receive Automatic Dependent Surveillance-Broadcast (ADS-B) data from neighboring aircraft. TIS-B data, ADS-B data, and other such external source data are preferably formatted to include air traffic state vector information, which may be utilized to determine a neighboring aircraft's current position and velocity. Furthermore, in accordance with embodiments of the present invention, the TIS-B data and/or the ADS-B may also be formatted to include additional information useful in determining other flight characteristics of the neighboring aircraft including a traffic category for fixed wing aircraft and a traffic category for rotorcraft. Processor 102 may receive user input via a user input device 116, and base a determination of hovering on one or more user input data.

The user input device 116 may be realized as a keypad, touchpad, keyboard, mouse, touchscreen, joystick, knob, microphone, speech recognition, gestures or another suitable device adapted to receive input from a user. The pilot may adjust and customize aspects of the display and method by entering parameters at the user input device 116. Adjustments according to user input parameters are performed by the processor 102.

Figure 2:
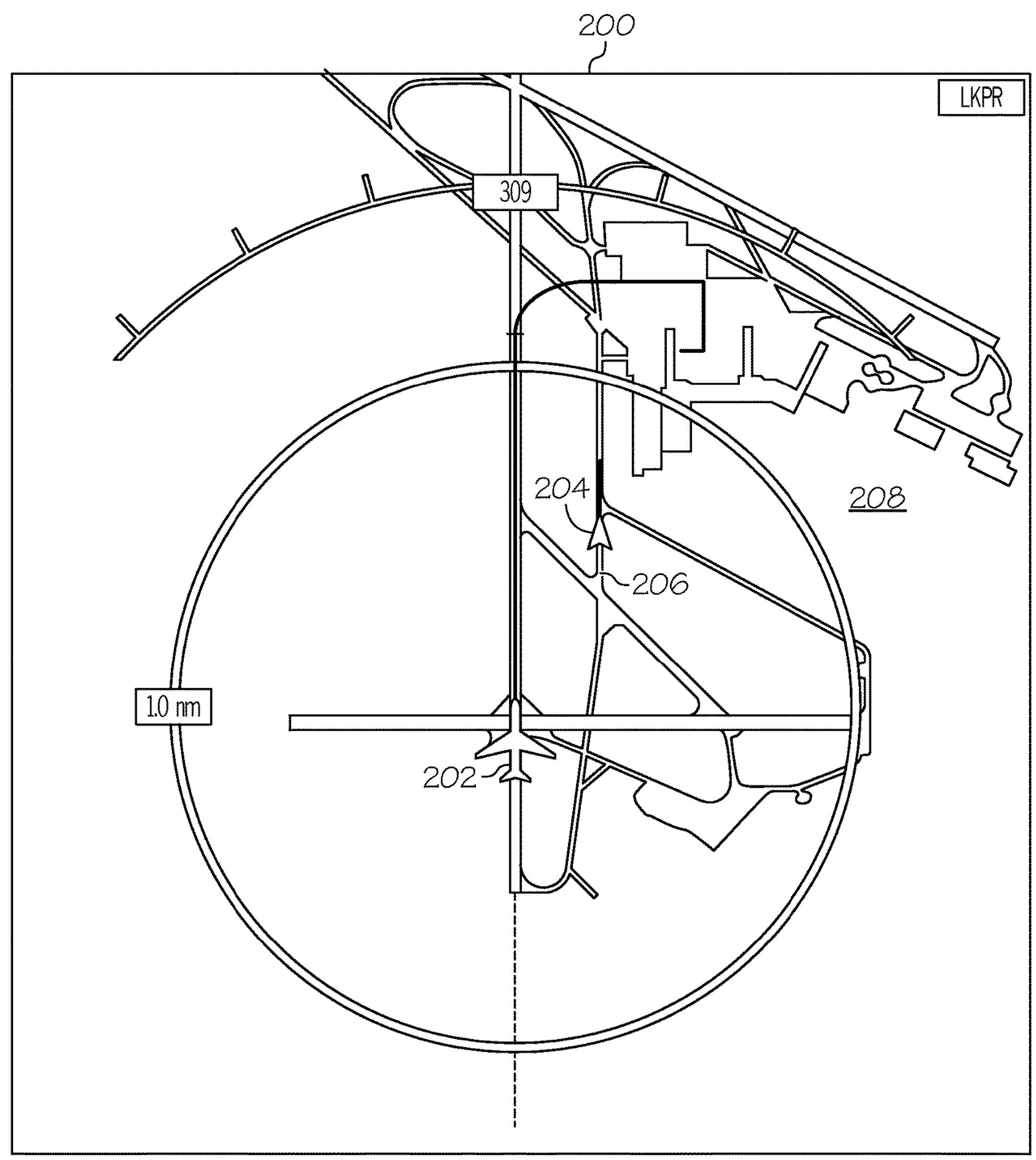
FIG. 2 is a simplified view of a typical moving map display graphic illustrating a host aircraft and surrounding area.

FIG. 2 is a simplified view of a typical moving map display graphic 200 illustrating a host aircraft and surrounding area. As can be seen, the graphic 200 illustrates a host aircraft 202 and a typical traffic symbol 204 associated with a neighboring aircraft; in this case one that is taxiing on a runway 206 of an airport generally designated 208. As described herein, the typical traffic symbol 204 may represent a fixed wing aircraft or a rotorcraft.

In accordance with an embodiment, processor 102 is configured to utilize traffic category data from a source such as ADS-B to identify in-air rotorcrafts. Processor 102 receives user input parameters via user input device 116 that define hovering as a change in position that is less than a predetermined threshold distance traveled in a predetermined threshold time (duration). Based on the user input parameters, processor 102 compares multiple samples of rotorcraft position data to determine a distance traveled (traveling distance) during the predetermined threshold duration. The rotorcraft's traveling distance within the threshold duration is the rotorcraft's hovering limit. For example, hovering may be defined as a rotorcraft positional change of less than ten meters in five seconds. By comparing the rotorcraft's hovering limit to the threshold distance parameter, processor 102 determines whether an aircraft is hovering. After identifying air traffic that are rotorcraft, and any hovering rotorcraft, processor 102 generates symbology data for transmission to monitor 104 to cause a rotorcraft icon, associated with each neighboring rotorcraft, to be generated on display 106.

Figure 3:
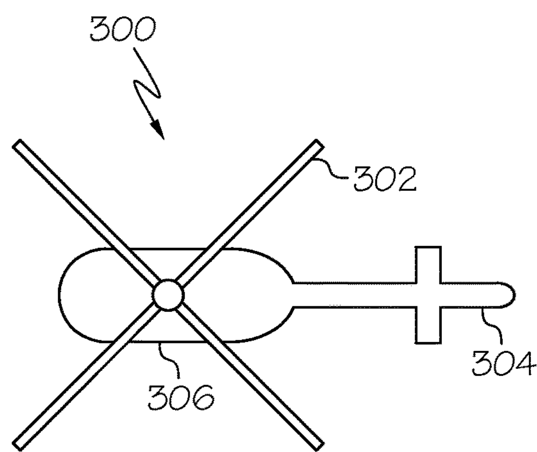
FIG. 3 illustrates a rotorcraft icon that graphically distinguishes a rotorcraft from other aircraft on a display, in accordance with an exemplary embodiment.

FIG. 3 illustrates a rotorcraft icon 300 that graphically distinguishes a rotorcraft from other aircraft traffic on a display, in accordance with an exemplary embodiment. The exemplary rotorcraft icon 300 depicts the rotors 302, tail 304, and rotorcraft body 306, providing rapidly discernible visual information that may assist the pilot in comprehending that the aircraft is a rotorcraft with a given position/location and orientation.

Figure 4:
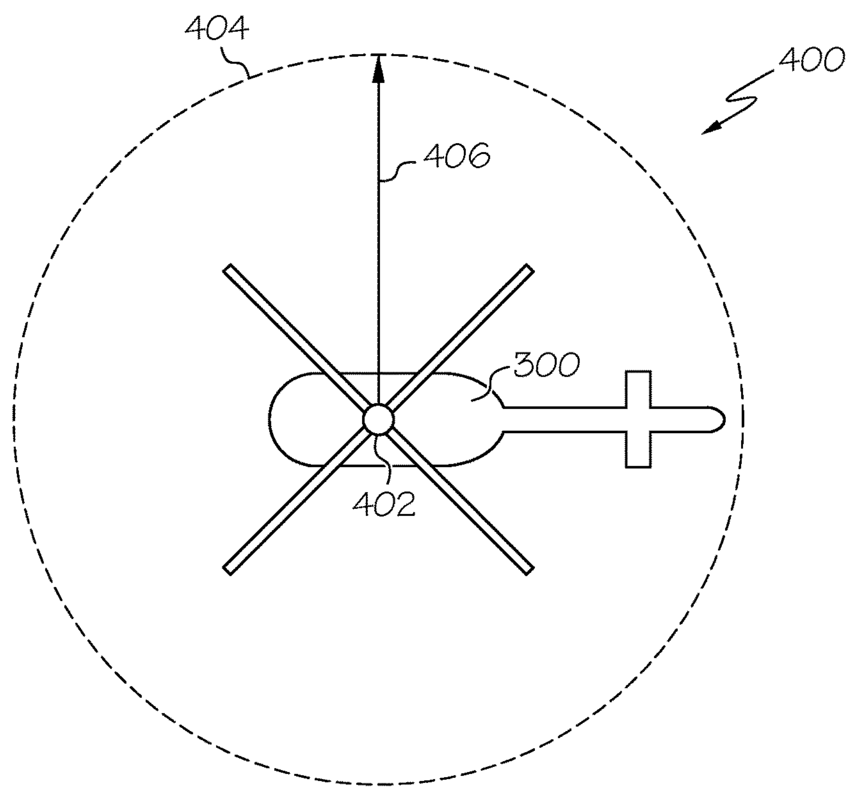
FIG. 4 illustrates a rotorcraft icon for indicating that a rotorcraft that is hovering, in accordance with an exemplary embodiment.

FIG. 4 illustrates a "hovering rotorcraft" icon 400 for graphically distinguishing a rotorcraft is hovering, in accordance with an exemplary embodiment. The exemplary embodiment 400 employs the rotorcraft icon 300 described in connection with FIG. 3, and overlays a hovering center 402 and a hovering limit 404. Processor 102 continually receives position data associated with aircraft traffic. As described above, the hovering limit represents a distance traveled by a rotorcraft within the threshold duration of time. In order to determine distance traveled, processor 102 determines a difference between a first position data and a second position data for an associated rotorcraft; the traveling distance is continuously compared to the threshold distance parameter. The hovering limit is representative of present and previous positions, and is also continually determined and updated by processor 102. The hovering limit provides a visual representation of anticipated positional changes for the associated rotorcraft within a given time (threshold duration parameter), and is graphically represented as a circle with a radius 406 that surrounds the rotorcraft icon.

Figure 5:
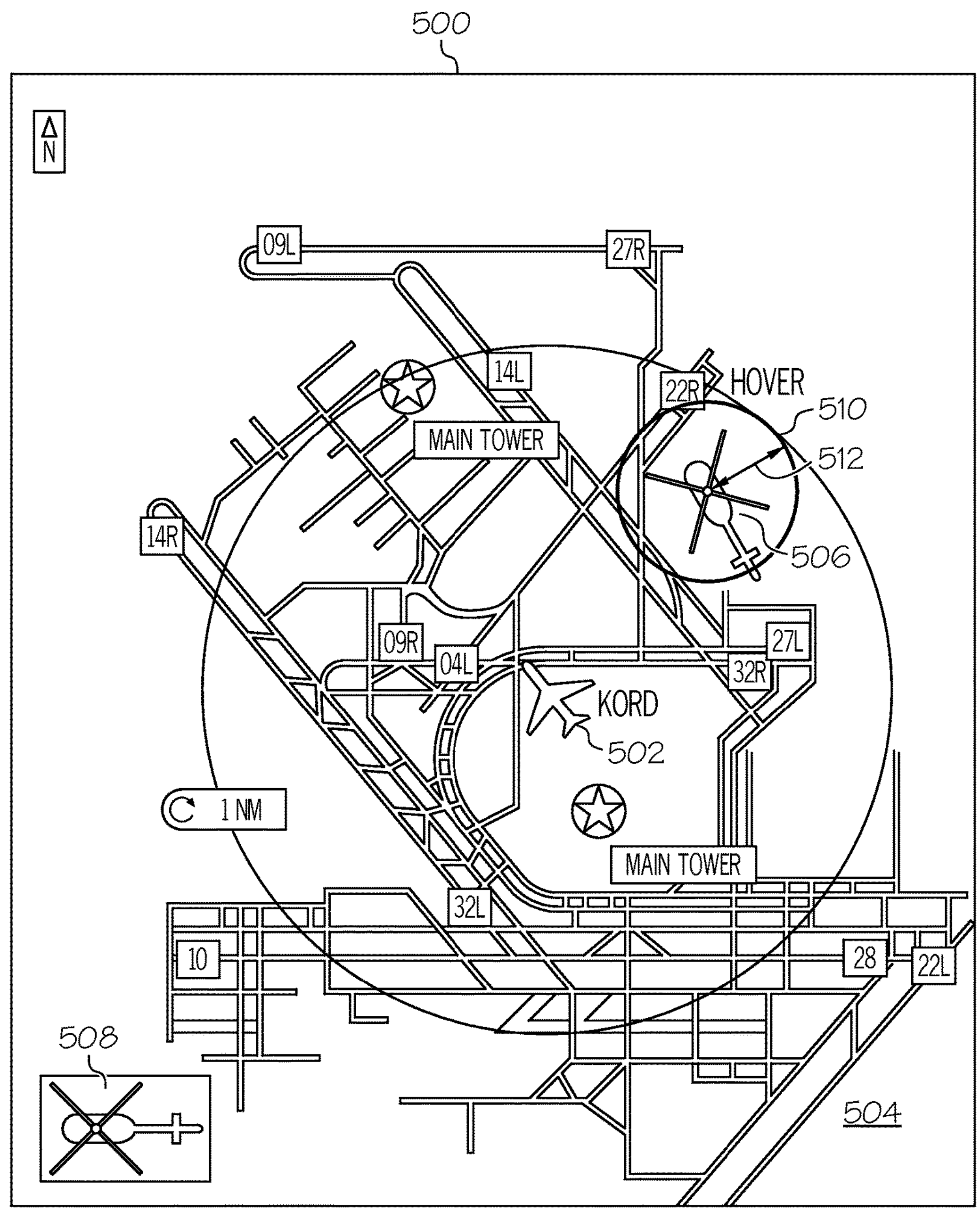
FIG. 5 is a simplified snapshot of a moving map display indicating a host aircraft, a nearby hovering rotorcraft, and a non-hovering rotorcraft, in accordance with an exemplary embodiment.

FIG. 5 is a simplified snapshot of a moving map display 500 indicating a host aircraft 502 in flight above an airport 504 with a nearby hovering rotorcraft 506 and a nearby rotorcraft 508, in accordance with an exemplary embodiment. The hovering rotorcraft icon 506 is overlaid with a substantially circular ring 510 of radius 512, representing the hovering limit. Non-hovering rotorcraft that are nearby are also displayed, for example, rotorcraft 508. The pilot's situational awareness is increased by the exemplary embodiment's visual presentation of simple, rapidly discernible, graphic symbology.

Figure 6:
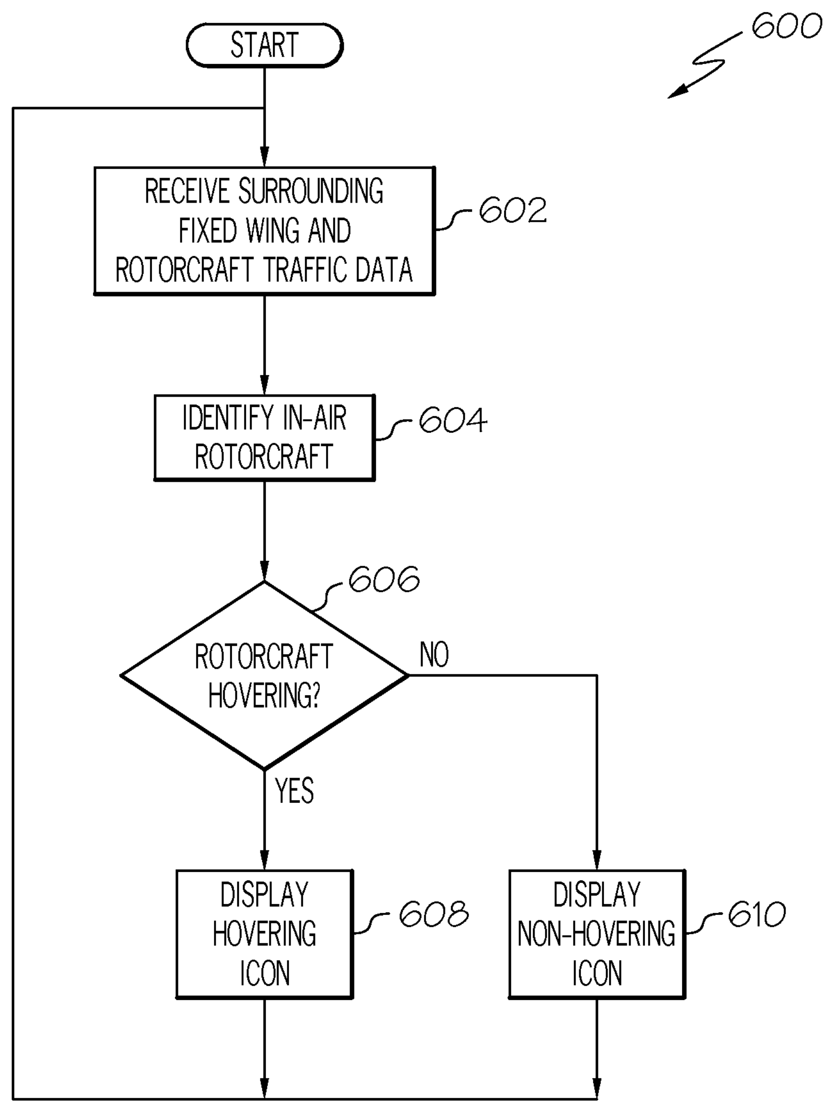
FIG. 6 is a flow-chart illustrating a method for generating a rotorcraft icon that graphically represents a neighboring rotorcraft and whether or not the rotorcraft is hovering.

FIG. 6 is a flow-chart illustrating a process 600 for generating a rotorcraft icon graphically representing a neighboring rotorcraft and whether or not the rotorcraft is hovering. In STEP 602, surrounding fixed wing and rotor wing (rotorcraft) traffic data is received from a data source such as ADS-B. In STEP 604, process 600 identifies rotorcraft and their position from among neighboring in-air aircraft traffic data. Next, process 600 determines, from among the in-air rotorcraft, which are the hovering rotorcraft (STEP 606). As described hereinabove, hovering is user defined as a positional change (in distance) of less than a predetermined threshold distance parameter during a predetermined amount of time. User input, provided via a user input device 116, may provide the predetermined threshold distance parameter and predetermined threshold duration. Processor 102 continuously receives sampled position data associated with neighboring rotorcraft and compares, for each rotorcraft, a rotorcraft first position to a rotorcraft second position; in response to the first and second position, processor 102 utilizes predetermined threshold distance parameter to determine if a rotorcraft is hovering and, if so, further determines a hovering limit, as described in connection with FIG. 2.

In STEP 608, process 600 graphically displays a hovering rotorcraft icon for each hovering rotorcraft. Neighboring rotorcrafts that are hovering will be displayed with an overlaid circle indicating an associated hovering limit. The hovering limit is visually conveyed as the radius of a circle overlaid on the rotorcraft icon on the display 106 (see, for example FIG. 5, radius 512). The radius of the overlaid circle may be continuously adjusted by processor 102 to update any detected change in the hovering limit. The hovering limit increases pilot situational awareness by providing a rapidly discernible visual indicator of an area around the rotorcraft that a host aircraft should avoid. In STEP 610, process 600 displays a rotorcraft icon for each non-hovering rotorcraft.

Thus, there has been provided a system and method that enables a pilot to rapidly discern not only the horizontal position of a neighboring traffic object, but also that the aircraft is a rotorcraft and whether it is hovering. The provided system and method allows user input to define hovering as a predetermined position change (distance) within a predetermined time, and further, graphically indicates a rotorcraft's hovering limit.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments.

What is claimed is:

1. A method for displaying a rotorcraft icon, comprising:
- receiving aircraft traffic data associated with neighboring aircraft;
- formatting aircraft traffic data to create a traffic category for rotorcraft;
- identifying, among neighboring aircraft in the rotorcraft category, a first rotorcraft; at a first location;
- receiving user input defining a predetermined threshold distance and a predetermined threshold time;
- determining whether the first rotorcraft is hovering based on the predetermined threshold distance and the predetermined threshold time; and
- displaying a hovering rotorcraft icon on the display when the first rotorcraft is determined to be hovering.

2. The method according to claim 1, wherein the step of displaying a hovering rotorcraft icon comprises generating graphical symbology representative of a rotorcraft shape within a substantially circular ring.

3. The method according to claim 2, wherein the step of displaying further comprises adjusting the radius of the circular ring to indicate a hovering limit of the first rotorcraft, wherein hovering limit is defined as a distance traveled by the first rotorcraft during the predetermined threshold time.

4. The method according to claim 1, further comprising displaying graphical symbology representative of a rotorcraft shape when the first rotorcraft is not hovering.

5. The method according to claim 3, further comprising:
- receiving a first position data and a second position data for the first rotorcraft; and
- wherein determining the distance traveled comprises determining a distance between the first position data and the second position data.

6. The method according to claim 5, further comprising comparing the traveling distance to the threshold distance parameter.

7. The method according to claim 2, wherein the location and orientation of the rotorcraft icon on the display is graphically representative of the first location.

8. A method for displaying a rotorcraft icon on a monitor included within an avionic display system of a host aircraft, comprising:
- receiving aircraft traffic data associated with neighboring aircraft;
- formatting aircraft traffic data to create a traffic category for rotorcraft;
- identifying, using the traffic category for rotorcraft, a first rotorcraft at a first location;
- displaying a rotorcraft icon representative of the first rotorcraft;
- receiving user input defining a predetermined threshold distance and a predetermined threshold time;
- receiving a first position data and a second position data for the first rotorcraft;
- determining a distance traveled by the first rotorcraft between the first position data and the second position data;
- determining whether the first rotorcraft is hovering based on the predetermined threshold distance, the predetermined threshold time, and the distance traveled; and overlaying the rotorcraft icon with a substantially circular ring when the first rotorcraft is determined to be hovering.

9. The method according to claim 8, wherein the step of displaying a hovering rotorcraft icon comprises generating graphical symbology in the shape of a rotorcraft.

10. The method according to claim 8, further comprising adjusting a first radius of the ring to indicate a hovering limit of the first rotorcraft, wherein hovering limit is defined as a distance traveled by the first rotorcraft during the predetermined threshold time.

11. An avionic display system for deployment onboard an aircraft including an air traffic data source that provides the avionic display system with aircraft traffic data, the system comprising:

a monitor included within the avionic display system, the avionic display system receiving and graphically displaying surrounding aircraft traffic data on the monitor; and a processor operatively coupled to the monitor and configured to format aircraft traffic data to create a traffic category for rotorcraft, identify, using the traffic category for rotorcraft, a first rotorcraft among surrounding aircraft traffic; at a first location;

receiving user input defining a predetermined threshold distance and a predetermined threshold time;

receive position data associated with the first rotorcraft, determine whether the first rotorcraft is hovering based on the predetermined threshold distance, the predetermined threshold time, and the position data and graphically display a hovering rotorcraft icon on the display when the first rotorcraft is determined to be hovering.

12. The avionic display system of claim 11, wherein the processor is further configured to display a rotorcraft shaped icon on the display representative of the first rotorcraft's location and orientation.

13. The avionic display system of claim 12, wherein the processor is further configured to display a substantially circular ring around a rotorcraft shaped icon when the rotorcraft is determined to be hovering.

14. The avionic display system of claim 13, wherein the processor is further configured to adjust the radius of the circular ring to indicate a hovering limit of the rotorcraft, wherein hovering limit is defined as a distance traveled by the first rotorcraft during the predetermined threshold time.

15. The avionic display system of claim 11, wherein determining the hovering limit comprises comparing the distance traveled to the threshold distance parameter.

* * * * *